United States Patent
Krottapalli et al.

(10) Patent No.: US 9,928,097 B1
(45) Date of Patent: Mar. 27, 2018

(54) METHODS, SYSTEMS, AND COMPUTER READABLE MEDIUMS FOR DEFINING AND UPDATING A VIRTUAL COMPUTING SYSTEM COMPRISING DISTRIBUTED RESOURCE COMPONENTS

(71) Applicant: VCE Company, LLC, Richardson, TX (US)

(72) Inventors: Praphul Krottapalli, Cary, NC (US); Neeloy Bhattacharyya, North Las Vegas, NV (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 123 days.

(21) Appl. No.: 14/852,970

(22) Filed: Sep. 14, 2015

(51) Int. Cl.
*G06F 9/455* (2006.01)
*G06F 9/445* (2018.01)
*G06F 17/30* (2006.01)

(52) U.S. Cl.
CPC ............ *G06F 9/45558* (2013.01); *G06F 8/65* (2013.01); *G06F 17/30321* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 8,286,174 | B1 * | 10/2012 | Schmidt | G06F 9/5077 709/226 |
| 8,782,322 | B2 * | 7/2014 | Houlihan | G06F 9/4856 711/165 |
| 8,990,374 | B2 * | 3/2015 | Otani | G06F 9/5072 709/223 |
| 2002/0129127 | A1 * | 9/2002 | Romero | G06F 9/505 709/220 |
| 2008/0059972 | A1 * | 3/2008 | Ding | G06F 9/505 718/105 |

(Continued)

OTHER PUBLICATIONS

VCE Company, LLC, "VBlock Solution for application lifecycle platform", pp. 1-33 (Aug. 2011).*

*Primary Examiner* — Mehran Kamran
(74) *Attorney, Agent, or Firm* — Jenkins, Wilson, Taylor & Hunt, P.A.

(57) ABSTRACT

Methods, systems, and computer readable mediums for defining and updating a virtual converged infrastructure system comprising distributed resource components are disclosed. According to one method, the method includes identifying resource components collectively contained in a plurality of computing systems interconnected to form a computing system network. The method further includes generating an index that specifies a plurality of candidate virtual computing systems, wherein each of the candidate virtual computing systems includes resource components from two or more of the computing systems and utilizing the index to select a virtual computing system from among the candidate virtual computing systems. The method also includes applying identification data corresponding to resource components of the selected virtual computing system as input to a certified computing configuration to identify a level of compliance of the selected virtual computing system.

14 Claims, 6 Drawing Sheets

(56) References Cited

U.S. PATENT DOCUMENTS

| | | | |
|---|---|---|---|
| 2008/0172672 A1* | 7/2008 | Logan | G06F 9/45533 718/104 |
| 2009/0106008 A1* | 4/2009 | Branson | G06F 9/5066 703/13 |
| 2010/0229175 A1* | 9/2010 | Gonzalez, Jr. | G06F 9/5077 718/104 |
| 2011/0022879 A1* | 1/2011 | Chavda | G06F 11/0793 714/1 |
| 2012/0272234 A1* | 10/2012 | Kaiser | G06F 11/3442 718/1 |
| 2013/0010801 A1* | 1/2013 | Morrow | H04L 12/66 370/401 |
| 2013/0232470 A1* | 9/2013 | Yung | G06F 8/40 717/121 |
| 2014/0040299 A1* | 2/2014 | Datla | G06F 17/30386 707/758 |
| 2014/0059196 A1* | 2/2014 | Onffroy | G06F 11/3688 709/223 |
| 2014/0059385 A1* | 2/2014 | Dolinsky | G06F 11/3688 714/33 |
| 2014/0068599 A1* | 3/2014 | Kannan | G06F 8/61 718/1 |
| 2014/0108937 A1* | 4/2014 | Datla | G06F 11/3006 715/735 |
| 2014/0108988 A1* | 4/2014 | Datla | G06F 3/0484 715/772 |
| 2014/0109094 A1* | 4/2014 | Datla | G06F 9/46 718/100 |
| 2014/0109097 A1* | 4/2014 | Datla | G06F 9/46 718/102 |
| 2014/0136801 A1* | 5/2014 | Birkestrand | G06F 12/00 711/153 |
| 2014/0189092 A1* | 7/2014 | Zhang | H04L 41/5019 709/224 |
| 2014/0280489 A1* | 9/2014 | Nandyalem | H04L 67/42 709/203 |
| 2014/0351400 A1* | 11/2014 | Madani | H04L 69/02 709/223 |
| 2014/0351440 A1* | 11/2014 | Madani | H04L 41/0813 709/226 |
| 2014/0351649 A1* | 11/2014 | Madani | G06F 11/079 714/37 |
| 2014/0351921 A1* | 11/2014 | Madani | H04L 63/029 726/14 |
| 2014/0351923 A1* | 11/2014 | Madani | H04L 63/029 726/14 |
| 2015/0082016 A1* | 3/2015 | Bonczkowski | G06F 8/61 713/100 |
| 2015/0142939 A1* | 5/2015 | Petrick | H04L 41/0813 709/223 |
| 2015/0172117 A1* | 6/2015 | Dolinsky | H04L 41/0893 709/221 |
| 2015/0229722 A1* | 8/2015 | Gong | H04L 67/1097 709/206 |
| 2015/0301853 A1* | 10/2015 | Nandyalam | G06F 9/46 718/105 |

* cited by examiner

| Component | Network Relation |
|---|---|
| CC 118A | [SC 119A: 1 : 10GB] : [NC 121A: 1 : 10GB] : [CC 118B: 2 : 10GB] : [SC 119B: 2 : 10GB] : [NC 121B: 2 : 9GB] : [CC 118C: 2 : 10GB] : [SC 119C: 2 : 10GB] : [NC 121C: 2 : 8GB] : [SC122 : 1 : 10GB] : [SC124 : 3 : 8GB] |
| SC 119A | [CC 118A: 1 : 10GB] : [NC 121A: 1 : 10GB] : [CC 118B: 2 : 10GB] : [SC 119B: 2 : 10GB] : [NC 121B: 2 : 9GB] : [CC 118C: 2 : 10GB] : [SC 119C: 2 : 10GB] : [NC 121C: 2 : 8GB] : [SC122 : 1 : 10GB] : [SC124 : 3 : 8GB] |
| NC 121A | [CC 118A: 1 : 10GB] : [SC 119A: 1 : 10GB] : [CC 118B: 2 : 10GB] : [SC 119B: 2 : 10GB] : [NC 121B: 2 : 9GB] : [CC 118C: 2 : 10GB] : [SC 119C: 2 : 10GB] : [NC 121C: 2 : 8GB] : [SC122 : 1 : 10GB] : [SC124 : 3 : 8GB] |
| .... | .... |
| NC 121C | [CC 118A: 2 : 8GB] : [SC 119A: 2 : 8GB] : [NC 121A : 2 : 8GB] : [CC 118B: 2 : 10GB] : [SC 119B: 2 : 10GB] : [NC 121B: 2 : 10GB] : [CC 118C: 2 : 10GB] : [SC 119C: 2 : 10GB] : [SC122: 3 : 10GB] : [SC124 : 1 : 10GB] |
| SC 124 | [CC 118A: 3 : 8GB] : [SC 119A: 3 : 8GB] : [NC 121A : 3 : 8GB] : [CC 118B: 2 : 10GB] : [SC 119B: 2 : 10GB] : [NC 121B: 2 : 9GB] : [CC 118C: 2 : 10GB] : [SC 119C: 2 : 10GB] : [NC 121C: 2 : 8GB] : [SC122 : 4 : 10GB] |

| Logical Grouping Identifier | Resource Components | Interoperability Score |
|---|---|---|
| 321 | SC 119A, NC 121A, CC 118B, SC 119B | 100% |
| 225 | SC 119A, NC 121A, CC 118B, SC 122 | 97% |
| 439 | NC 121A, CC 118B, SC 119C, SC 122 | 95% |
| •••• | | |
| 105 | CC 118B, NC 121A, SC 122, SC 124 | 71% |
| 39 | CC 118B, NC 121A, SC 119B, NC 121B, SC 124 | 65% |

METHODS, SYSTEMS, AND COMPUTER READABLE MEDIUMS FOR DEFINING AND UPDATING A VIRTUAL COMPUTING SYSTEM COMPRISING DISTRIBUTED RESOURCE COMPONENTS

TECHNICAL FIELD

The subject matter described herein relates to providing a recommendation and an update of resource components residing a plurality of converged infrastructure systems. More specifically, the subject matter relates to methods, systems, and computer readable mediums for defining and updating a virtual computing system comprising distributed resource components.

BACKGROUND

In the computing system industry, various system models, such as converged infrastructure (CI) system models, may be validated to run very specific versions of firmware and software that have been thoroughly tested and verified to function properly. For example, this validation process enables system operators to avoid spending a significant amount of time conducting their own validations to locate versions of compatible CI component software. Notably, the aforementioned validation process results in a certified computing system configuration or certified Ci configuration (e.g., such as a Release Certification Matrix (RCM) or some other type of defined converged infrastructure configuration model for a specific CI system). For example, prior to delivery to a customer site, a computing system, such as CI system unit, is provisioned with an initial converged infrastructure configuration version. Over time, new converged infrastructure configuration versions are released and the system operator may decide to migrate to the new certified CI configuration version. To perform this migration process, system operators must read documentation from the CI manufacturer that addresses the firmware and software versions. Afterwards, the system operator must locate the correct firmware and software updates and installation instructions for each of the hardware and software components in the CI from one or more manufacturers. Notably, the amount of time required to plan and coordinate such a system configuration update is considerable. Even more time consuming is the amount of time associated with updating a virtual CI system that includes resource components from two or more physical CI systems. In particular, since the resource components corresponding to a virtual CI system are initially considered from the entire pool of resources contained in multiple interconnected CI systems, the number of component combinations and permutations are exponentially increased. As such, subjecting the various components associated with all of the possible candidate virtual CI systems to a certified CI configuration can unnecessarily result in the consumption of considerable network resources.

SUMMARY

Methods, systems, and computer readable mediums for defining and updating a virtual computing system comprising distributed resource components are disclosed. According to one method, the method includes identifying resource components collectively contained in a plurality of computing systems interconnected to form a computing system network. The method further includes generating an index that specifies a plurality of candidate virtual computing systems, wherein each of the candidate virtual computing systems includes resource components from two or more of the computing systems and utilizing the index to select a virtual computing system from among the candidate virtual computing systems. The method also includes applying identification data corresponding to resource components of the selected virtual computing system as input to a certified computing system configuration to identify a level of compliance of the selected virtual computing system.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable mediums for updating resource components in a virtual computing system. In some embodiments, the disclosed subject matter utilizes a special purpose host server provisioned with a virtual computing system management (VCSM) engine that is configured to facilitate the discovery of all the resource components residing in a plurality of computing systems that belong to a computing system network. For example, the host server may capture identification data associated with each of the resource components in the computing system network and subsequently utilize the captured data to generate a catalog of the discovered resource components, each of which may be subsequently considered for the formation of multiple possible/candidate virtual computing systems. The VCSM engine may then be configured to utilize the data included in the component catalog resource to create an index of multiple permutations of possible/candidate virtual computing systems and determine an interoperability score for each of the indexed permutations (in a manner described below). Based on the determined interoperability scores, the VCSM engine may designate and/or recommend a target virtual computing system to be subjected to a certified computing system configuration (e.g., an RCM) based on the respective interoperability levels of the candidate virtual computing systems.

In some embodiments, the disclosed subject matter can be utilized by within a network system that is distributed among a plurality of discrete network segments or computing systems (e.g., a single computer network system location or a geographically separated computer network system) which may include converged infrastructures (Cis) or "integrated infrastructures". In particular, although the following description is presented in the context of converged infrastructures for the illustration purposes, any type of computing system may be utilized without departing from the scope of the disclosed subject matter. As used herein, a CI, such as a Vblock® System from VCE Company, LLC, can comprise multiple converged infrastructure components in a preconfigured, pretested, and/or prepackaged computing platform that may be customized to the requirements of a user. For example, a CI can include a single computing platform unit associated with racks of physical CI components and related software for performing virtualization and/or other information technology (IT) functions. In some embodiments, each CI component associated with a CI can comprise a compute component, a software component, a networking component, a hardware component, or a firmware component. For example, a CI can comprise data storage devices, compute devices (e.g., a unified computing system device), networking equipment (e.g., switch devices), and software for managing physical resources and/or virtualized resources (e.g., virtual servers). In some embodiments, both the distributed network system and CI architecture may be utilized jointly together without departing from the scope of the disclosed subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
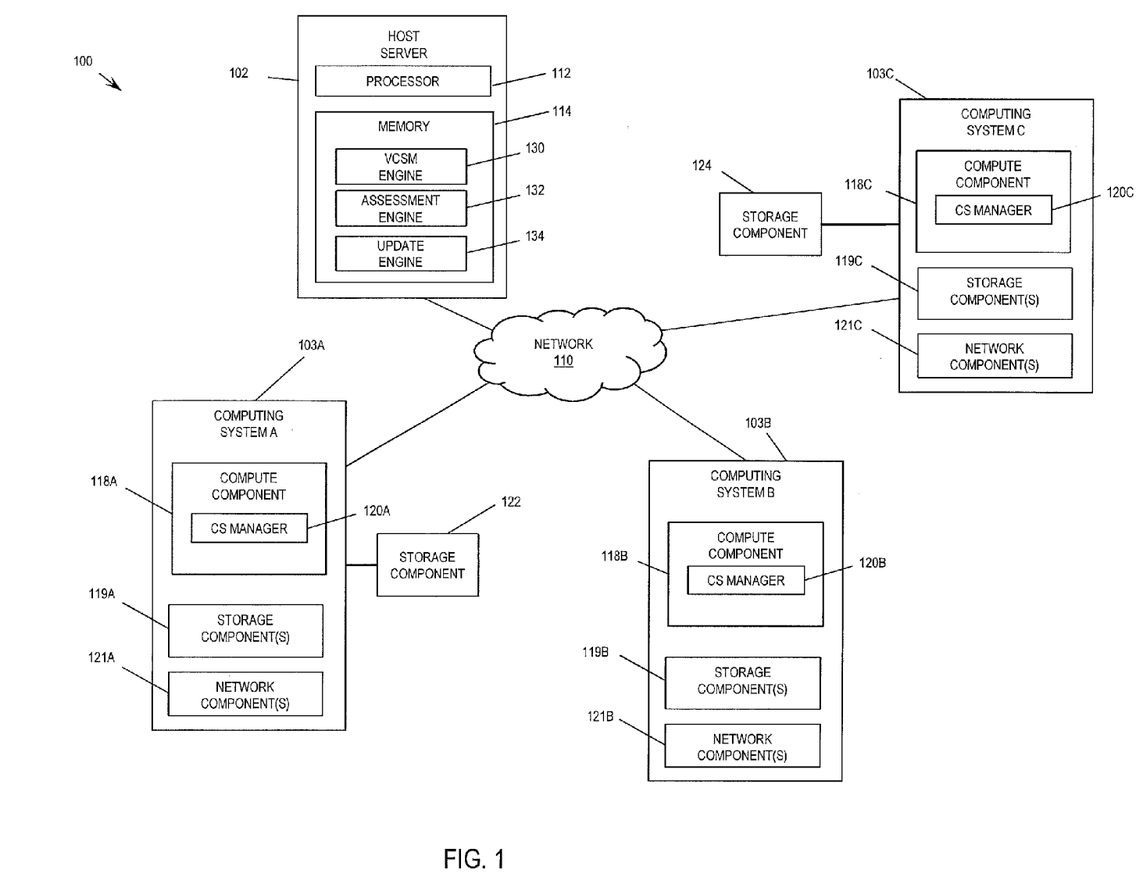
FIG. 1 is a block diagram depicting a network of computing systems according to an embodiment of subject matter described herein.

FIG. 1 is a block diagram illustrating an exemplary computing system network, generally designated 100, according to an embodiment of the subject matter described herein. Notably, computing system network 100 includes a host server 102 and a plurality of computing systems 103A-C, which may comprise converged infrastructures (CIs), and a plurality of technology extensions, such as standalone storage components 122-124. In some embodiments, each of the computing systems 103A-C may be used to host one or more enterprise applications supported in network 100. As used herein, an enterprise application may include an entire software application program or any portion thereof that utilizes a plurality of processes (e.g., subprograms, workload services, software algorithms, etc.) to perform an activity or service that may be useful to a user. Exemplary enterprise applications include, but are not limited to, an electronic mail service application, a web-based banking application, a multimedia streaming application, a stock trading platform application, and the like. In some embodiments, the enterprise application may be supported by one or more virtual machine executing the aforementioned software application.

In some embodiments, each computing system 103 may include at least one compute component 118, which can comprise one or more processors and at least one memory. Each of the processors (not shown) included in compute component 118 may include a microprocessor (e.g., a trusted platform module (TPM) using trusted execution technology (TXT)), a central processing unit (CPU), or any other like hardware based processor unit. Likewise, the memory (not shown) in compute component 118 may include random access memory (RAM), read only memory (ROM), optical read/write memory, cache memory, magnetic read/write memory, flash memory, or any other non-transitory computer readable storage medium. In some embodiments, memory may also respectively include and/or support a computing system manager, such as CS manager 120 (e.g., a CI manager). Notably, each computing system 103 is provisioned with its own respective CS manager 120. Although FIG. 1 only depicts three computing systems 103A-C, network 100 may include and/or utilize additional computing systems or CIs without departing from the scope of the disclosed subject matter.

As indicated above, computing system network 100 may further include host server 102 that is communicatively connected to each of computing systems 103A-C. Host server 102 may comprise either a customized computer machine or a CI including a VCSM engine 130 that is configured for facilitating the disclosed subject matter. Notably, VCSM engine 130 on host server 102 may be configured to capture resource component data from each of computing systems 103A-C. In some embodiments, each of CS managers 120A-C in computing systems 103A-C may be communicatively linked to host server 102 via a direct connection, a wireless connection, a wired connection via a core switch, a direct connection (without a core switch, patch panel, or like device) and/or through a communications network 110, such as the Internet. Accordingly, the functionality provided by the disclosed subject matter can be provisioned at a single geographic site or, alternatively, can span across multiple geographic sites. As shown in FIG. 1, host server 102 may include VCSM engine 130, an assessment engine 132, an update engine 134, at least one processor 112, and at least one memory 114. In some embodiments, processor 112 and memory 114 may be similar to the processor(s) and memory described above with respect to compute components 118A-C in both form and function. Notably, processor 112 and memory 114 may be used to execute and support VCSM engine 130, assessment engine 132, and update engine 134. In some embodiments, both VCSM engine 130 and CS managers 120A-C may comprise, or be a part of, VCE Vision™ Intelligent Operations software and/or firmware that may be executed by a processor or any other processing unit (e.g., compute components) residing in the host device.

In some embodiments, the plurality of computing systems 103A-C may be interconnected to form computing system network 100 by the network components residing within the computing systems. For example, network components 121A-C may be used as switches to create a mesh network among computing systems 103A-C (and/or host server 102) in order to establish a common pool of resource components (e.g., components 118A-C, 119A-C, and 121A-C) that is accessible by each of computing systems 103A-C. Notably, in some embodiments, the interconnection of computing systems 103A-C can be conducted without the utilization of a patch panel device or core switch, which is commonly used to establish a connection among network switches, data storage servers, and processing servers in traditional data center facilities. Further, one or more computing systems in network 100 may be communicatively connected (e.g., wirelessly or via a direct wired connection) to at least one technology extension. As used herein, a technology extension may include standalone resource component that may be used to modularly expand and enhance an existing computing system. For example, an example technology extension can include a standalone compute component, network component, or storage component, such as storage components 122-124 depicted in FIG. 1. In some embodiments, the interconnection of computing systems 103A-C and/or storage components 122-124 may be established and/or managed by VCSM engine 130 (in communication with CS managers 120A-C).

In some embodiments, VCSM engine 130 may comprise a software module stored in memory 114 that is configured to coordinate the operation and execution of assessment engine 132 and update engine 134. Although assessment engine 132 and update engine 134 are shown to be separate entities from VCSM engine 130 in FIG. 1, engines 132-134 may be incorporated within engine 130 in alternative embodiments without departing from the scope of the disclosed subject matter. Notably, VCSM engine 130 may be used, via assessment engine 132, to identify all of the resource components collectively contained in each of physical computing systems 103A-C and technology extension storage components 122-124. In some embodiments, VCSM engine 130 and/or assessment engine 132 may be configured to query the CS manager for resource identification data (e.g., make number, model number, firmware version number, etc.) corresponding to the compute component(s) 118, storage component(s) 119, and network component(s) 121 within each computing system. CS managers 102A and 102C may also be queried for resource identification data corresponding to storage components 122 and 124, respectively, by VCSM engine 130.

In some embodiments, host server 102 may be configured to receive a request message (e.g., from a system administrator) indicating a request for resources in network 100 to support an enterprise application. In response, VCSM engine 130 may be initiated by host server 102 in order to define and establish a virtual computing system capable of supporting the enterprise application. In particular, VCSM engine 100 may determine the requirements necessary to support an enterprise application and begin determining which resource components should be allocated from the pooled resources (e.g., compute components 118A-C, storages components 119A-C, network components 121A-C, and technology extension storage components 122-124) of network 100. For example, upon receiving the request message for the candidate virtual CI system, VCSM engine 130 may initiate and utilize assessment engine 132 to issue query messages to CS managers 120A-C. More specifically, assessment engine 132 may be configured (e.g., preprogrammed by a system administrator) to request resource component data from each CS manager 120 on each of computing systems 103A-C. For example, assessment engine 132 may be configured to conduct an automated check of available physical resource components existing in and/or associated with a plurality of candidate computing systems (e.g., the resource components and technology extensions associated with physical computing systems 103A-C). In some embodiments, assessment engine 132 may comprise a monitoring tool that is configured to obtain identification data and utilization data of all physical resource components in network 100. In some embodiments, assessment engine 132 may be configured to send a resource component query message to each of CS managers 120A-C. For example, the resource component query message sent by assessment engine 132 may comprise a ping-like message requesting the hardware information and status information associated with each of the CS managers 120A-C in order to determine the resource components presently residing and/or being utilized in computing systems 103A-C. Notably, the resource component data requested from the CS managers residing in and/or being utilized by each of computing systems 103A-C by assessment engine 132 may include, but not limited to, i) hardware component identification information (e.g., manufacturer and model identification/serial numbers), ii) software component identification information (e.g., software and/or firmware version numbers), iii) resource component utilization data (e.g., data indicating an accounting of the available resources of a resource component, such as CPU processing, RAM, memory, data storage, network bandwidth, etc.), iv) network connectivity information, and/or the like.

Figure 2:
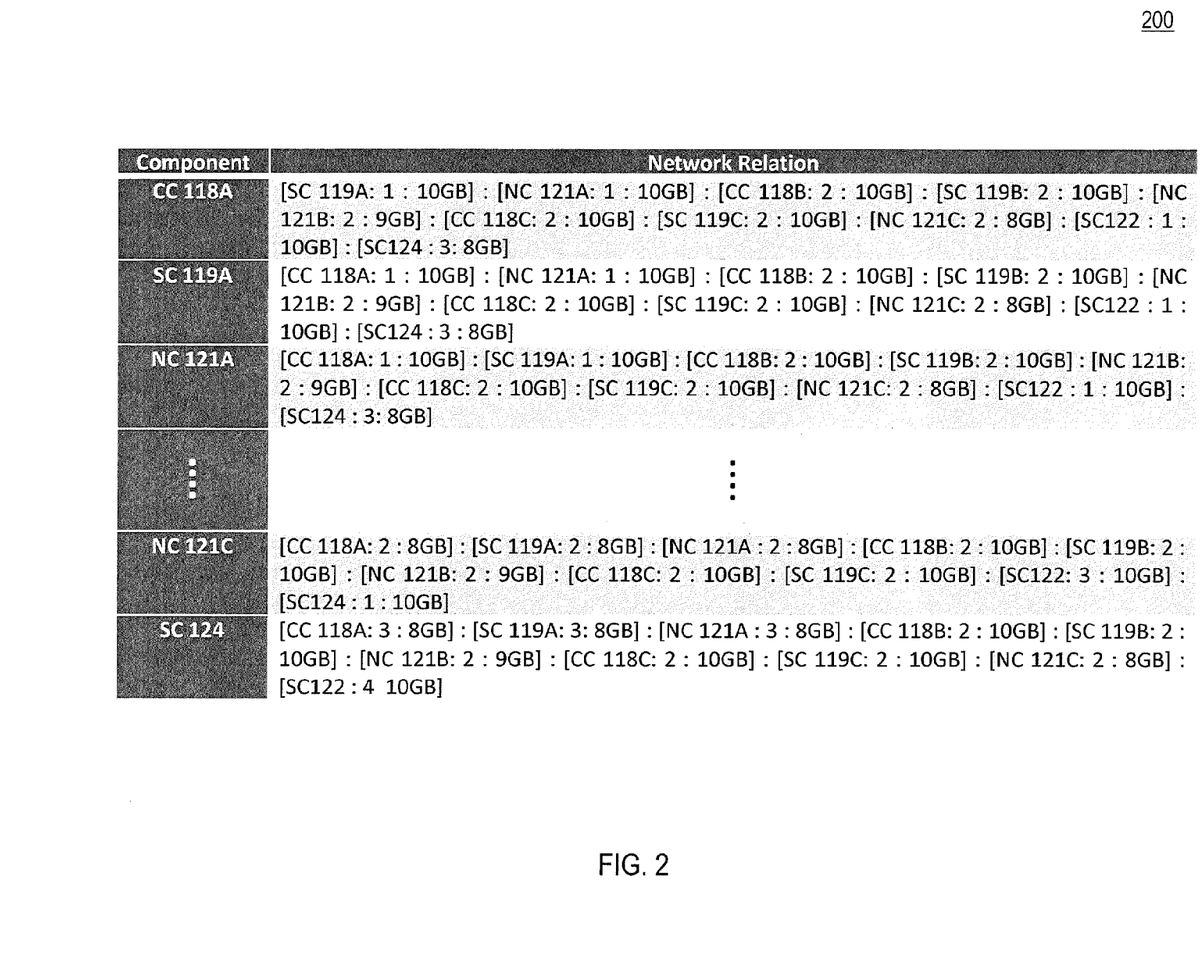
FIG. 2 is a diagram illustrating an exemplary component catalog according to an embodiment of the subject matter described herein.

Upon receiving the resource component utilization data from each of CS managers 120A-C, VCSM engine 130 and/or assessment engine 132 may be configure to derive a catalog of all available resource components residing in network 100. One exemplary catalog (i.e., catalog 200) generated by VCSM engine and/or assessment engine is depicted in FIG. 2. In some embodiments, catalog 200 includes a number of entries, each of which includes a resource component and its network relation to each other resource component. For example, using the components depicted in FIG. 1 as an example, the first entry of catalog 200 includes compute component 118A and its relationship with the other resource components and technology extensions of network 100. A relationship in catalog 200 between a first component and a second component may be represented by a tuple [$2^{nd}$ component identifier: latency existing between components: available bandwidth of the link between components] in the first component's entry. In some embodiments, latency may be measured or quantified using one or more of a ping measurement (e.g., 12 milliseconds) and/or the number of hops existing between two components. Similarly, the available bandwidth of link may be measured quantified by measurements of the upload speeds and/or download throughput (e.g., 10 Gigabits per second). For example, the first tuple, i.e., [SC 119A: 1: 10 G], in the second column of the first entry indicates that compute component 118A and storage component 119A indicates that there is one hop between the two components (i.e., the two components reside in the same physical computing system) and that the amount of bandwidth capacity of an interconnecting link is 10 G. Notably, each of the other components and technology extensions that can be communicatively connected (albeit via other interconnecting elements) to compute component 118A are further represented in additional tuples in the first entry of catalog 200. Moreover, subsequent entries of catalog 200 list the remaining components and technology extensions (e.g., SC 119A, NC 121 A, . . . , NC 121C, and SC 124) of network 100. In some embodiments, the latency measurement and the amount of available bandwidth may be combined by VCSM engine 130 into a single metric that is representative of an "effective bandwidth". Notably, the effective bandwidth and/or the underlying upload/download speeds may be controlled by a system administrator via QoS settings on supporting network switches (e.g., network components and/or core switch).

The derived catalog (e.g., catalog 200) may subsequently be utilized by VCSM engine 130 to generate an index (e.g., index 300 in FIG. 3) specifying a plurality of candidate virtual computing systems (e.g., possible virtual CI system candidates to be subjected to a certified CI configuration, such as a RCM). For example, the index 300 depicted in FIG. 3 may comprise a database table that comprises a plurality of entries, each of which specifies a logical grouping identifier, the resource components that would be used by a particular candidate virtual computing system (i.e., that is identified by the logical grouping number), and a respective calculated interoperability score. Index 300 is explained in greater detail below.

In some embodiments, VCSM engine 130 may be configured to identify and group a number of resource components into a candidate virtual computing system (e.g., a candidate virtual CI system). For example, VCSM engine 130 may determine that a particular computing system does not possess the necessary number of storage components (i.e., amount of necessary data storage) to support a particular enterprise application or workload on a first physical computing system (e.g., a first physical CI system). Consequently, VCSM engine 130 may identify and "tag" an available storage component contained in a second separate physical computing system that may be used to supplement the resource components designated in the first computing system. Such a designation of resource components collectively included in two separate physical computing systems may be defined as one candidate virtual computing system. This designation is also depicted and described below with respect to the disclosure of FIG. 5 (e.g., see "dotted box" that is indicative of a candidate virtual computing system, such as a candidate virtual CI system). Further, other candidate virtual computing systems may be defined utilizing different components that may or may not reside on the physical computing systems described above.

In some embodiments, VCSM engine 130 may be configured to consider technology extensions in the same manner as a resource component for the virtual computing system. As used herein, a technological extension may include a separate standalone device (e.g., a separate resource component) that is typically located externally from a physical computing system and is used to assist with the supporting of the physical computing system, e.g., by executing or storing software, a database, or the like. For example, FIG. 1 depicts technological extensions comprising storage component 122 and storage component 124. Notably, storage component 122 is connected to and located externally from computing system 103A and storage component 124 is connected to and located externally from computing system 103C.

Likewise, in some embodiments, VCSM engine 130 may be configured to calculate the interoperability score for each candidate virtual computing system. For example, VCSM engine 130 may utilize update engine 134 to calculate an interoperability score for the virtual CI system in the same manner an interoperability score for a physical computing system is computed. Notably, in this scenario, the only difference is that the virtual computing system is a software construct (which can be dynamically changed) that is subjected to the certified computing system configuration, whereas the physical computing system includes statically bound hardware components. In some embodiments, the interoperability score may, for each candidate virtual computing system, be based on one or more factors including, but not limited to, the latency and/or a number of hops existing between the physical computing systems containing the resource components in a candidate virtual computing system, the available bandwidth of a link connecting the resource components in a candidate virtual computing system, and/or an amount of effort needed to conduct an update procedure on a candidate virtual computing system (e.g., the "larger" the difference i) between the firmware update version number and the current firmware version number currently installed on one or more components and/or ii) between the version release date of a firmware update and the version release date of the firmware currently installed on one or more components, the "greater" the amount of effort needed to conduct an update).

In some embodiments, VCSM engine 130 may be configured to assign weights to each of these factors to calculate the interoperability score for each candidate virtual computing system. For example, VCSM engine 130 can be configured to assign a 30% weight to the latency factor, a 50% weight to the bandwidth factor, and a 20% weight to the version update factor. engine 130 may then multiply the respective weights to the measured and/or quantified values of the factors to derive an interoperability score for a virtual candidate computing system.

After performing the interoperability score calculations for the virtual candidate computing systems, VCSM engine 130 may be configured to compare (e.g., rank) all of the computed interoperability scores with each other in order to select and designate the candidate virtual computing system associated with the highest interoperability score as the "selected virtual computing system". For example, such a ranking may be organized using the index 300 depicted in FIG. 3. For example, the index 300 depicted in FIG. 3 may comprise a database table that comprises a plurality of entries, each of which specifies a logical grouping identifier, the resource components that would be used by a particular candidate computing virtual system (i.e., that is identified by the logical grouping number), and a respective calculated interoperability score. For example, the first entry of index 300 includes a logical grouping identifier of "321" and includes a group of resource component including SC 119A, NC 121A, CC 118B, SC 119B. Notably, the combination of these resource components earned an interoperability score of 100%. Similarly, the second entry of index 300 includes a logical grouping identifier of "225" and includes a group of resource component including SC 119A, NC 121A, CC 118B, SC 122 that attained an interoperability score or 97%. In some embodiments, the interoperability score may be determined based on applying a certified computing system configuration to each of the logical groupings.

Figure 3:
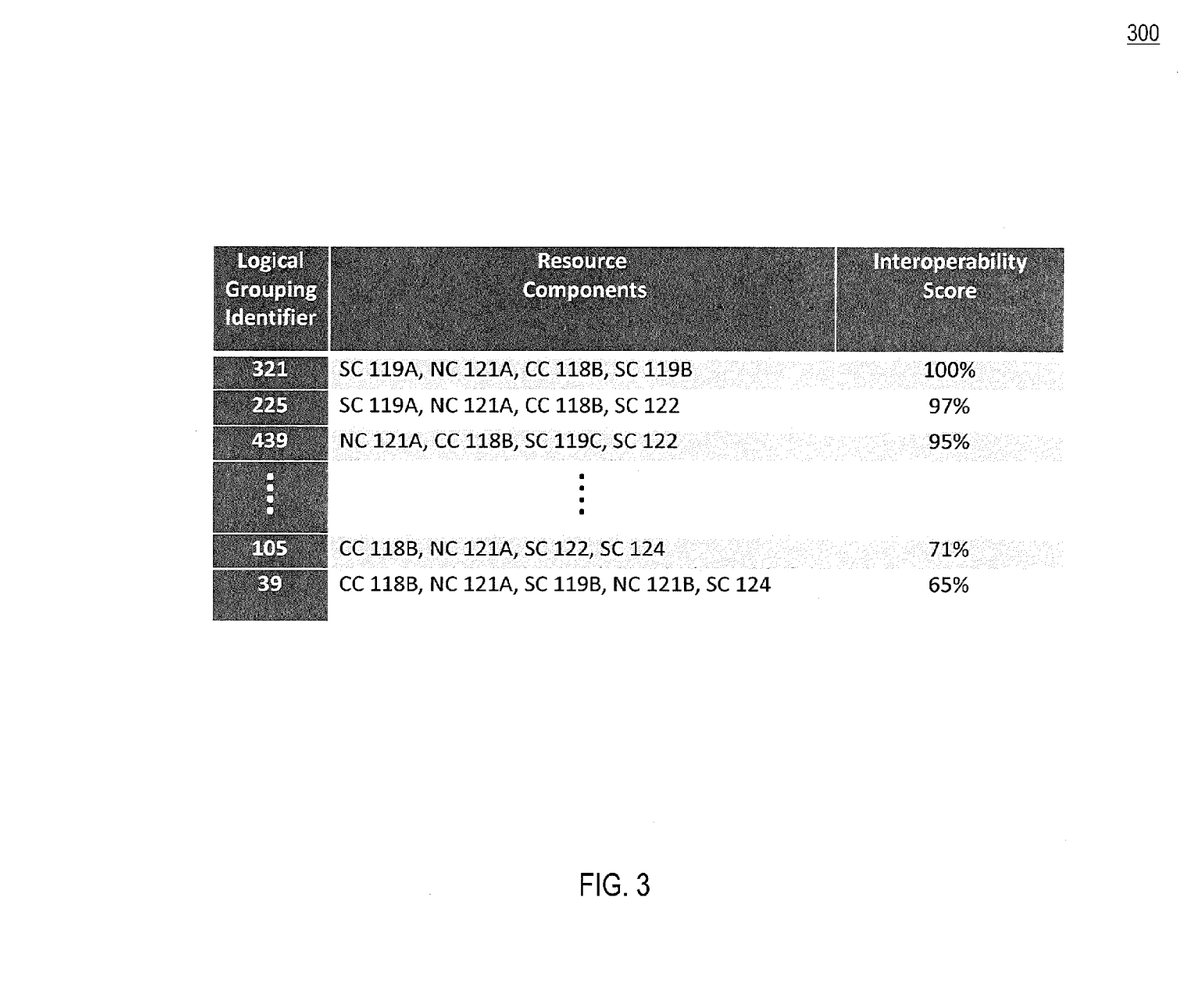
FIG. 3 is a diagram illustrating an exemplary virtual computing system index according to an embodiment of the subject matter described herein.

Alternatively, VCSM engine 130 may present the calculated and ranked interoperability scores to a system administrator (e.g., displaying index 300 via a GUI). For example, assessment engine 132 may be configured to present all of the interoperability scores on a computer display, a mobile device screen, a control room display, or any other user interface and/or display that is used by a system administrator of network 100. In such embodiments, the user may select a candidate virtual computing system or confirm the VCSM engine's selection of the virtual computing system associated with the highest interoperability score.

In some embodiments, VCSM engine 130 may include a compliance check functionality (e.g., using assessment engine 132) that is configured to identify the resource components of the selected virtual computing system that require remediation and/or updating in order to comply with a certified computing system configuration. For example, upon being notified of the certified computing system configuration version to be applied to a computing system, VCSM engine 130 may be configured to compare the version identifiers of the resource components (e.g., the revision/version number of the associated computing system component firmware, BIOS, software, drivers, etc.) associated with the certified computing system configuration version to the revision identifiers of the computing system components currently utilized by the computing system. In some embodiments, VCSM engine 130 may calculate the interoperability score of resource component or a technology extension based on the "version difference" of the firmware running on a resource component as compared to the latest firmware version (e.g., version 2.0 vs. version 1.1.1). Similarly, the VCSM engine 130 may calculate the interoperability score of resource component or a technology extension based on the time period difference of the release date of the firmware running on a resource component as compared to the latest firmware version release date (e.g., firmware release date of Jan. 30, 2013 vs. firmware release date of Sep. 6, 2015). The manner in which the version numbers or the version release dates are weighted or quantified is user configurable and can be performed by any known means.

In some embodiments, a repository (e.g., see repository 250 in FIG. 4) that may be managed by a vendor entity and/or computing system manufacturer entity) can be configured to publish the certified computing system configuration (e.g., RCM) in a machine-readable format (e.g., YAML, XML, and the like) such that the certified computing system configuration can be automatically processed by VCSM engine 130 and/or update engine 134 without any human intervention. Namely, VCSM engine 130 may compare and contrast the identifiers of the resource components with the certified computing system configuration data recorded in an XML file in an automated fashion. Further, VCSM engine 130 may compare the version identifiers and/or release dates associated with the most recent firmware version and the firmware currently being run on a resource component or technology extension. In some embodiments, the version identifiers being compared may comprise any number of letters, numbers, and/or symbols.

In some embodiments, VCSM engine 132 may be further configured to facilitate a remediation feature that enables an authorized user (e.g., a system operator) to configure a virtual computing system in a manner that complies with a certified computing system configuration. If the components composing the selected virtual computing system are not in a supported configuration (e.g., outdated firmware, BIOS, software, etc.), VCSM engine 130 is enabled to remediate one or more of the components within the selected virtual computing system so that the associated resource components are compliant with a certified computing system configuration. Upon determining that one or more of the components of the selected virtual computing system is non-compliant, VCSM engine 130 may initiate update engine 134 to locate and access the requisite remediation content (e.g., binary software needed to remediate each non-compliant computing system component). In some embodiments, CS manager 102 may have access to remediation content (such as remediation software content that comprises binary software) needed to remediate and update each non-compliant computing system component present in its respective physical computing system.

In particular, the migration of the virtual computing system from one certified computing system configuration version to another certified computing system configuration version can prove to be an extremely time consuming process. In some embodiments, each non-compliant hardware component and software component in the virtual computing system needs to be updated in a specified order (as outlined by the certified computing system configuration version) for the migration to complete successfully. Accordingly, VCSM engine 130 can be configured utilize update engine 134 to update individual resource components one at a time. Update engine 134 can support updates occurring in any order. For example, update engine 134 may provide the suggested order from an update guide while still allowing the system operator to select a different order. Update engine 134 may also be configured to update the identified computing system components in a sequential manner, such as a updating the computing system components in a specified order (e.g., a sequential update process).

In some embodiments, update engine 134 may be further configured to send a remediation content request message to a repository (such as repository 250 described below and depicted in FIG. 4). The repository, in response to received message, may provide the required update content information for the specific certified computing system configuration version (e.g., an RCM version for a CI system) to update engine 134 via a response message. VCSM engine 130 and/or update engine 134 may then apply the remediation content to the resource components of the virtual computing system in the manner described above.

As indicated above, the subject matter disclosed herein can be implemented in software and/or firmware in combination with hardware. For example, the subject matter described herein can be implemented in software executed by a processor (e.g., processor(s) 112 in FIG. 1). In one exemplary implementation, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, VCSM engine 130, assessment engine 132, and/or update engine 134 may be located at a single computing system or may be distributed across one or more devices, platforms, and/or systems. As used in the present disclosure, the terms "function", "module", or "engine" refer to hardware, firmware, or software in combination with hardware and/or firmware for implementing features described herein.

Figure 4:
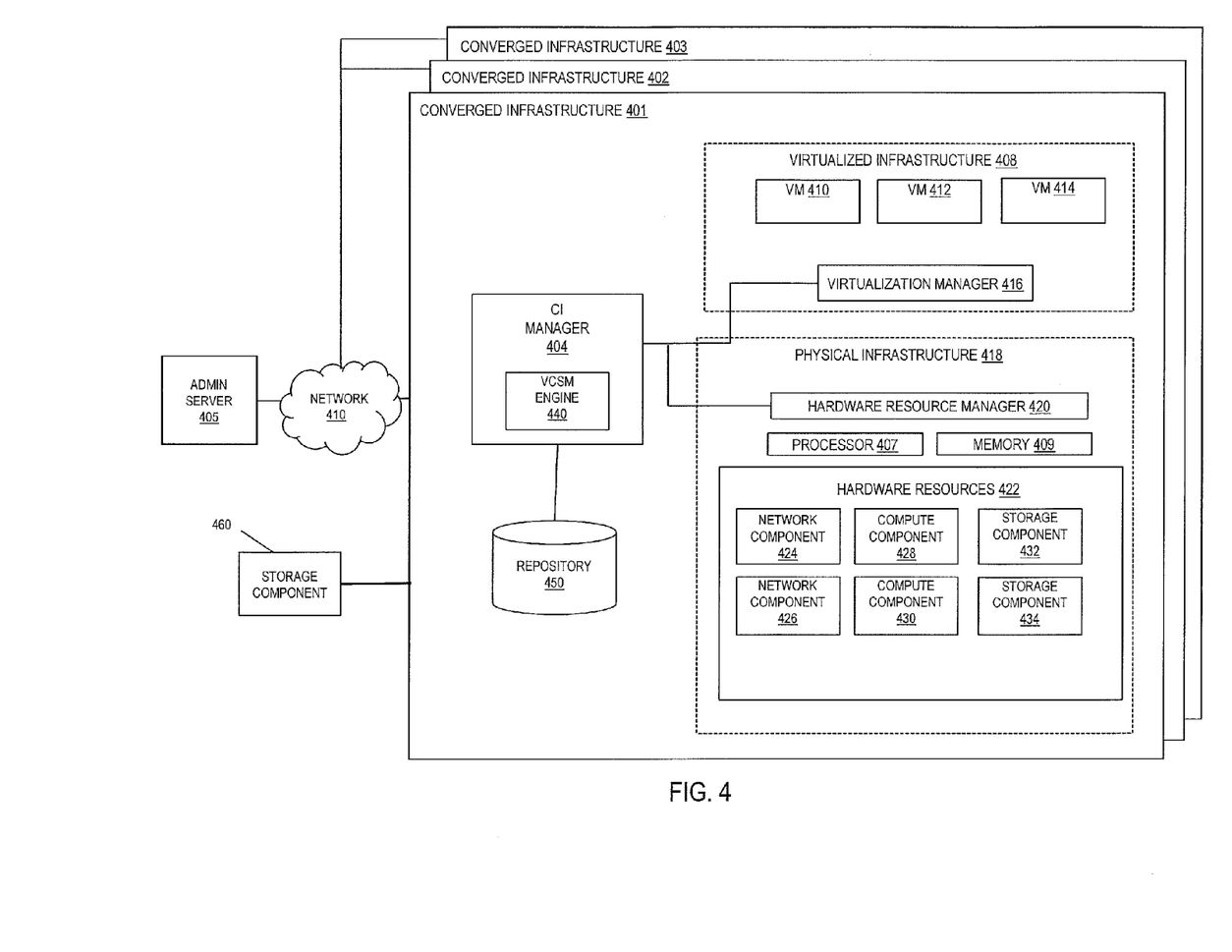
FIG. 4 is a diagram illustrating exemplary physical converged infrastructure systems according to an embodiment of the subject matter described herein.

FIG. 4 is a logical block diagram that depicts example computing systems, namely, CIs 401-403 (similar to each of physical computing systems 103A-C depicted in FIG. 1) according to an embodiment of the subject matter described herein. In this particular example, a VCSM engine 440 is depicted as residing on a CI system 401 (as opposed to residing on a host server 102 in FIG. 1). In some embodiments, each of CIs 401-403 can comprise a plurality of infrastructure components, including one or more hardware resource components and one or more virtual resource components. Examples of hardware resource components can comprise processors, compute devices, network equipment, data storage devices, routers, switches, wiring or cabling, physical ports, and/or communications interfaces. Exemplary virtual resource components can comprise a virtual entity (e.g., an entity that appears as a physical entity but is supported and/or hosted by one or more hardware CI components associated with one or more CIs) such as, but not limited to, a virtual machine, a virtual server, a virtual storage device, a virtual port, and/or a virtual communications interface. As indicated above, CI 401 includes at least one processor 407 that may comprise a microprocessor, a CPU, or any other like hardware based processor unit. Likewise, CI 401 includes memory 409 that may comprise RAM, ROM, optical read/write memory, cache memory, magnetic read/write memory, flash memory, or any other non-transitory computer readable medium. Notably, processor 407 may access and utilize memory 409 via a system bus or backplane to execute CI manager 404 in the manner described below. CI 401 may also comprise software and related CI components for managing the CI and/or portions therein. Although not depicted in FIG. 4, processor 407 and memory 409 may in some embodiments be part of a compute component, not unlike compute components 428-430.

In some embodiments, CI 401 can be configured to provide data storage functionality, cloud service functionality, and/or other IT functionality which can support a vast number of software enterprise applications. CI 401 can also be configured to communicate via network 410 (similar to network 110 in FIG. 1) with various other entities, such as CIs 402-403, an administration server 405, network nodes, and users. In some embodiments, CI 401 can comprise a CI manager 404, a virtualized infrastructure 408, and/or a physical infrastructure 418. CI manager 404 may be any suitable entity for managing the operation of CI 401 and may be configured to communicate with various CI components, such as virtual resources, physical resources, and/or software for managing various CI components. Further, CI manager 404 may provide a single interface to manage and monitor storage, network and compute components. For example, CI manager 404 may be configured to manage performance, resource utilization levels, and other aspects associated with virtualized infrastructure 408 and/or physical infrastructure 418. Further, CI manager 404 may be configured to manage and monitor a technology extension, such as storage component 460. In some embodiments, CI manager 404 comprises VCE Vision™ Intelligent Operations software and/or firmware that may be executed by processor 407 or any other processor unit present in CI 401 (e.g., compute components 428-430).

In some embodiments, virtualized infrastructure 408 can comprise a virtualization environment configured to simulate components of a computing device (e.g., a processor and system memory) and a storage device for executing one or more virtual machines (VMs). For example, each of VM 410, VM 412, and VM 414 may be configured to perform various functions and/or services, such as web server functions, application server functions, or cloud application services, and may interact with various nodes, components, and/or users.

In some embodiments, virtualized infrastructure 408 may be associated with one or more virtual entities. Each virtual entity can be supported by one or more CI or portions therein, such as underlying infrastructure elements (e.g., components 424-434) included within one or more CIs. In some embodiments, virtualization manager 216 may allow logical entities to be created, deleted, or modified using an API, a GUI, or a CLI. Virtualization manager 416 may be any suitable entity (e.g., software executing in a virtual machine) for managing aspects associated with virtualized infrastructure 408. In some embodiments, virtualization manager 416 may be configured to provide management functionality through one or more communications interfaces. For example, virtualization manager 416 may communicate with CI manager 404 using one or more APIs. In some embodiments, virtualization manager 416 may obtain resource component data from each of virtual machines 410-414 prior to forwarding the resource component data to CI manager 404.

Physical infrastructure 418 can comprise hardware resources 422, which may include resource components, such as network components 424-426, compute components 428-430 (sometimes referred to as hosts, compute devices, and/or compute servers), and storage components 432-434 (e.g., which may collectively function as a storage area network (SAN)). Hardware resources 422 may be communicatively connected to various other components in CI 401 and other entities. Hardware resources 422 can be configured to support one or more virtual entities. For example, compute component 428 and storage component 432 may be used in implementing VM 410 and VM 412 while compute component 430 and storage component 434 may be used in implementing VM 414 and virtualization manager 416. In some embodiments, one or more file share storage (FSS) systems (not shown) can be utilized to provide file system level access to a CI across a local area network (LAN). In some embodiments, network components 424-426 (e.g., network switches) may be configured to enable communication between the resource components within the CI as well as with resource components within other CIs (e.g., CIs 402 and 403).

Hardware resource manager 420 may be any suitable entity (e.g., software executing within a virtual machine or software executed by processor 407) for managing aspects associated with physical infrastructure 418. In some embodiments, hardware resource manager 420 may be configured to provision hardware resources 422 via one or more communications interfaces. For example, hardware resource manager 420 may provision any of hardware resources 422 in order to implement one or more virtual entities in virtualized infrastructure 408. In some embodiments, hardware resource manager 420 may comprise any management component or entity, such as a unified infrastructure manager (UIM) or a unified computing system (UCS) director entity, which is configured to manage and/or provision the physical hardware resources of CI 401.

In some embodiments, CI manager 404 and/or hardware resource manager 420 may be configured to monitor and/or record resource component data pertaining to each of network components 424-426, compute components 428-430, and storage components 432-434. For example, in some embodiments, CI manager 404 is initially installed and provisioned (e.g., hardcoded) with identifiers of the storage components, network components, and compute components incorporated in CI 401. Hardware resource manager 420 may also be provisioned with this resource component identification data. In the event a new resource component (e.g., a new storage disk) is added to CI 401, hardware resource manager 420 is able to detect the new component and makes a record. Notably, when CI manager 404 queries hardware resource manager 420 for resource component data, CI manager 404 will receive an update containing the new component information data.

Upon receiving a request message for establishing a virtual CI system from a system administrator (e.g. via administration server 405), VCSM engine 440 on CI 401 may prompt CI manager 404 to communicate with hardware resource manager 420 in order to request the requisite resource component data. Hardware resource manager 420 may then forward any collected resource component data to CI manager 404, which in turn forwards the data to VCSM engine 130. In some embodiments, hardware resource manager 420 may be configured to record the resource component data, which may include the i) the manufacturer, model type, and/or quantity of hardware elements (e.g., hardware processors, memory chips, etc.) included within CI 401 and ii) the type and version number of the deployed software utilized by the hardware resource components.

In some embodiments, one or more of data storage components 432-434 may be configured to function as a repository and store resource component information (e.g., data indicating which CI components are included and/or provisioned within a CI) for CI 401. In some embodiments, CI manager 404 may utilize an API interface (e.g., a RESTful API) to access and/or query hardware resource manager 420 to obtain the identification information regarding components 424-434 that has been previously collected by hardware resource manager 420 and/or virtualization manager 416.

In some embodiments, CI manager 404 can be utilized to request and process resource component data received from the CI components via hardware resource manager 420 in CI 401. For example, CI manager 404 may be configured to receive query messages by VCSM engine 440, which may reside locally (as depicted in FIG. 4) or external to CI 401. In response to the query, CI manager 404 may request and receive resource component data from hardware resource manager 420, which maintains a catalog record of each of network components 424-426, compute components 428-230, storage components 432-434, and/or their respective operating systems (not shown).

In some embodiments, CI 401 can include a local repository 450 that may comprise any data storage unit (e.g., a database or plurality of databases) configured to store remediation software content (e.g., CI system configuration update content) used to update the CI components of a selected virtual CI system. In some embodiments, the remediation software content can comprise such as a firmware package, a BIOS package, or a software package, or any other package configured to contain binary software content. Although FIG. 4 depicts repository 450 as a local data storage unit residing on CI 401, repository 450 can also be embodied as a data storage unit located at a public distributed content site, on a local proxy server in a customer's environment, or on a different CI unit without departing from the scope of the disclosed subject matter. In some embodiments, repository 450 may be provisioned with remediation software content that is sourced from a known, online location (e.g., hosted by creators of the software content). In some alternate embodiments, repository 450 can be provisioned with remediation software content sourced from a second repository (e.g., from a second CI or an online location). For example, the provisioning of remediation software content copied from a second repository may be conducted using any form of transportable media, such as a compact disc (CD), universal serial bus (USB) device, and the like. Similarly, the remediation software content may be copied from an online site, online repository, or any other online location over a network, using secure copy (SCP) protocol, file transfer protocol (FTP), or any like protocol. In some embodiments, CI 401 and a second CI (e.g., CI 402) may be located at a common geographical site and can be communicatively connected by a wired connection. In such a configuration, repository 450 may be provisioned with remediation software content from the second CI via the wired connection (e.g., facilitated via network components).

In some embodiments, a local update engine (not shown) utilized by VCSM engine 440 may comprise an update framework module or any suitable entity (e.g., software executing on a processor) for implementing a certified CI configuration (e.g., an RCM update) to one or more resource components on CI 401. For example, to implement a certified CI configuration update within CI 401 or portion therein, an update engine may be configured to conduct authorization and authentication processes, obtain remediation software content data from repository 450, and perform any additional actions required to conduct a CI configuration update.

It will be appreciated that FIG. 4 is a logical block diagram that illustrates an exemplary embodiment and that various computing system nodes, their locations, and/or their functions as described above in relation to FIG. 4 may be changed, altered, added, or removed.

Figure 5:
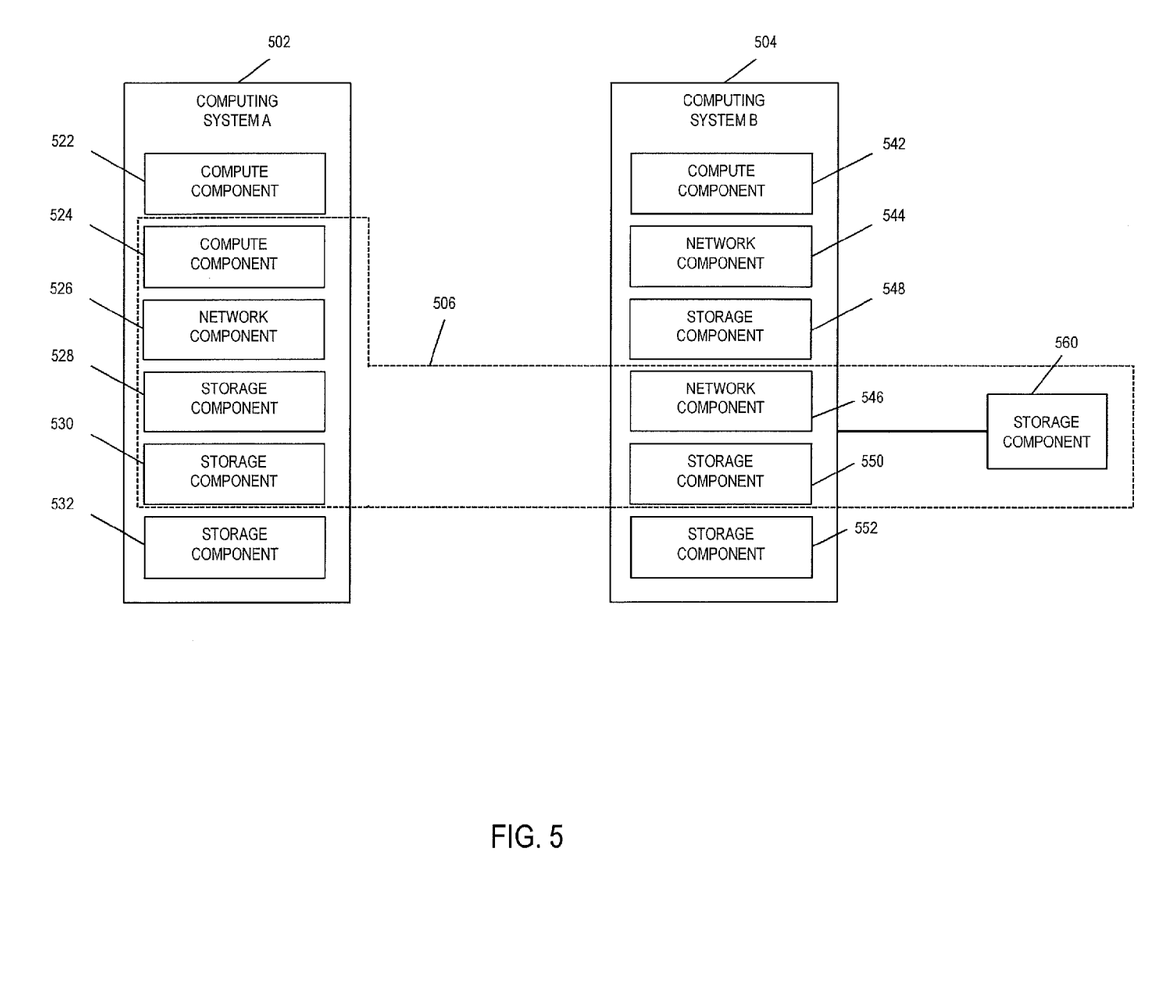
FIG. 5 is a diagram illustrating an exemplary virtual computing system according to an embodiment of the subject matter described herein.

FIG. 5 is a block diagram illustrating the designating of an exemplary virtual computing system according to an embodiment of the subject matter described herein. In FIG. 5, computing system 502 and computing system 504 may include computing systems (e.g., CI systems) that are communicatively interconnected (not shown) via network component switches (e.g., components 526 and 546) and/or other computing systems. Notably, each of computing system 502 and computing system 504 include a plurality of components. For example, computing system 502 includes compute components 522-524, network component 526, and storage components 528-532. Similarly, computing system 504 includes compute component 542, network components 544-546, and storage components 548-552. In some embodiments, a VCSM engine (e.g., VCSM engine 130 shown in FIG. 1) may be configured to designate the combination of compute component 524, network components 526 and 546, and storage components 528, 530, and 550 as a candidate virtual computing system 506 (e.g., as illustrated by the dashed box in FIG. 5). Notably, virtual computing system 506 comprises components from at least two physical computing systems, i.e., computing system 502 and computing system 504. Further, if virtual computing system 506 is characterized by the VCSM engine as having the highest calculated interoperability score as compared to other candidate virtual computing systems, the VCSM engine may select virtual computing system 506 from among these other candidate virtual computing systems to be utilized to support an application and be subjected to a certified computing system configuration (e.g., an RCM for a CI system). By restricting the certified computing system configuration processing to only the selecting virtual computing system 506 (i.e., via the restriction of the domain of components), significant processing resources that would be needed to determine the compatibility of other candidate virtual computing system permutations can be avoided.

In some embodiments, VCSM engine 130 may also be configured to receive input data comprising a defined combination of computing system components and/or technology extensions (i.e., a proposed virtual computing system defined and/or customized by a user) from a system administrator. Upon receiving this input data, VCSM engine 130 may proceed and generate an interoperability score for the proposed combination in addition to providing a recommended upgrade procedure. In some embodiments, the user may select/define the combination of computing system components and/or technology extensions in a graphical manner. For example, VCSM engine 130 may support a graphical user interface (GUI) that allows a user to i) select the components and/or technological extensions with an encompassing drawn box (e.g., as shown in FIG. 5), ii) drag and drop the selected components in a designated "selection box", or iii) simply marking checkboxes on the graphically displayed components themselves. After making the selection of components, the user may be subsequently presented with the calculated interoperability score determined by VCSM engine 130. In some embodiments, the user may also utilize the GUI supported by VCSM engine 130 to drill down into the displayed interoperability score in order to inspect how each respective component of the virtual computing system is contributing the calculated score.

Figure 6:
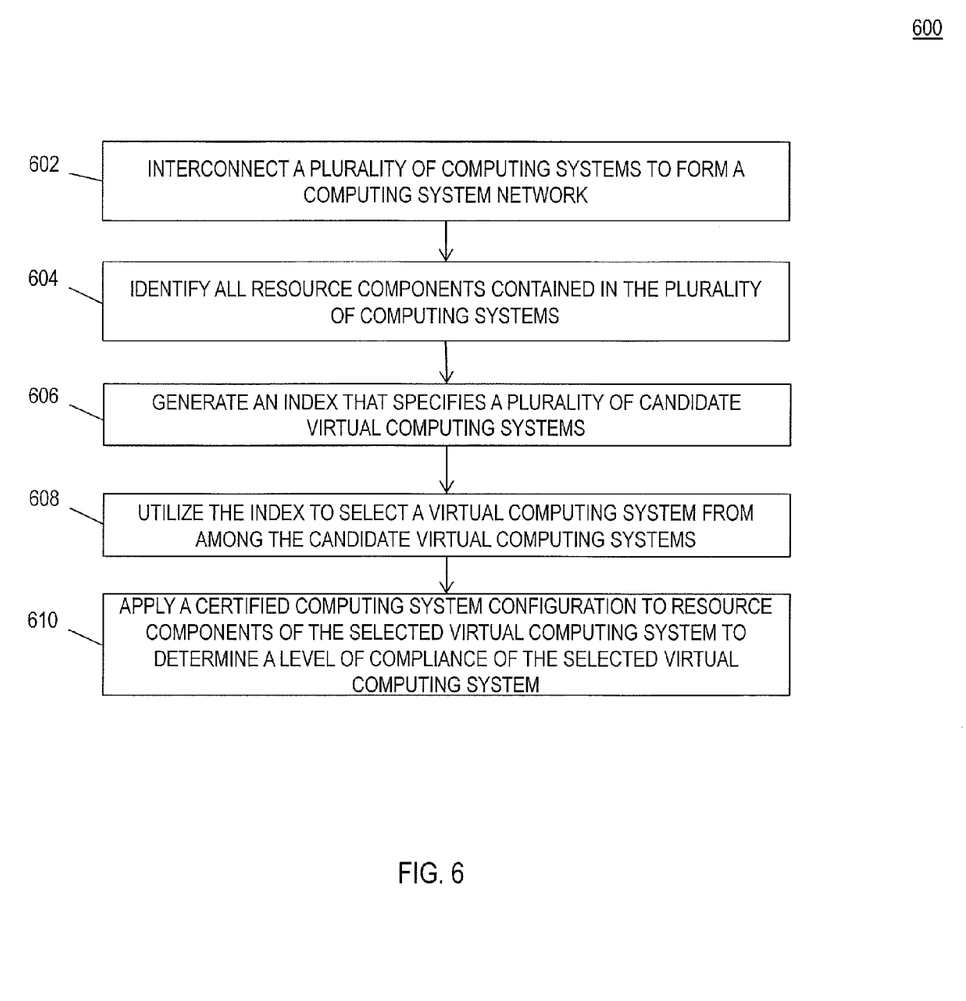
FIG. 6 is a diagram illustrating an exemplary method for defining and updating a virtual computing system comprising distributed resource components according to an embodiment of the subject matter described herein.

FIG. 6 is a diagram illustrating an exemplary method 600 for defining and updating a virtual computing system according to an embodiment of the subject matter described herein. In block 602, a plurality of computing systems are interconnected to form a computing system network (e.g., CIs interconnected to form a CI system network). In some embodiments, the computing system managers in each of the computing systems are configured to communicate with each other (e.g., via their respective network components) to establish a mesh network that enables the collective computing systems to combine their resource components into a common resource pool.

In block 604, the resource components contained in the computing systems are identified. In some embodiments, the computing system managers in each of the computing systems are able identify the components residing within its computing system. For example, a CS manager (e.g., a CI manager) may query a hardware resource manager to obtain identification information related to all of the hardware components (and their respective firmware/software versions) provisioned in the computing system. Similarly, a CS manager in each computing system is able identify any (if any) technology extensions utilized and supporting its computing system. Upon obtaining this identification information, a CS manager may be configured to send the resource component identification data to the VCSM engine. After receiving the resource component identification information from the CS managers, the VCSM engine is able to generate a resource component catalog that lists of all of the components included in the computing system network (e.g., computing system network 100 shown in FIG. 1).

In block 606, an index specifying a plurality of candidate virtual computing systems is generated. In some embodiments, the VCSM engine may be configured to utilize the component catalog to consider a plurality of different candidate virtual computing systems, each of which respectively includes a one possible permutation and/or combination of resource components and/or technology extensions included in the resource component catalog. After logically establishing a plurality of different candidate virtual computing systems, the VCSM engine may be configured to derive an interoperability score for each of the candidate virtual computing systems. As indicated above, the calculation of each interoperability score may be based on effective bandwidth existing between the components included in the candidate virtual computing system. In some embodiments, the effective bandwidth may comprise i) the number of hops and/or components included in the candidate virtual computing system and ii) the available amount of bandwidth and/or throughput afforded by the components of the candidate virtual computing system, and/or iii) the amount of effort required to conduct an update procedure on the candidate virtual computing system (e.g., the larger the difference between firmware release dates and/or firmware version numbers). After the interoperability scores are derived, the VCSM engine may generate the index (e.g., "candidate index") that ranks all of the candidate virtual computing systems in accordance to its interoperability scores (e.g., in a descending order).

In block 608, the index is utilized to select a virtual computing system from among the candidate virtual computing systems. In some embodiments, the VCSM engine may be configured to use the candidate index to select a virtual computing system. For example, VCSM engine can be configured to select the candidate virtual computing system with the highest interoperability score. In an alternate embodiment, the VCSM engine may be configured to present the index to a user (e.g., a system administrator) to allow that user to select (e.g., via a GUI) one of the candidate virtual computing systems.

In block 610, identification data corresponding to resource components of the selected virtual computing system are applied as inputs to a certified computing system configuration (e.g., a certified CI configuration) in order to identify a level of compliance of the selected virtual computing system (e.g., virtual CI system). For example, the VCSM engine may determine whether any of the resource components belonging to the selected virtual computing system are presently non-compliant. In the event one or more of the resource components are determined to be non-compliant, the VCSM engine may utilize the update engine to identify remediation content for the components. In some embodiments, the update engine is configured to apply the identification data (e.g., alphanumeric identifiers) associated with the components of the selected virtual computing system (e.g., selected by either the VCSM engine or the user) to the certified computing system configuration (e.g., an RCM) as input data. Upon receiving the component identifier input data, VCSM engine may be configured to identify the remediation content (e.g., software, firmware, binary data, etc.) that is needed to update the selected virtual computing system. After identifying the remediation content, the update engine may further obtain the remediation content and apply it to the resource components of the virtual computing system in accordance to a determined installation guideline (e.g., a specified order).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method to create and update a virtual computing system comprising distributed resource components, the method comprising:
    identifying resource components collectively contained in a plurality of computing systems interconnected to form a computing system network;
    generating an index that specifies a plurality of candidate virtual computing systems, wherein each of the candidate virtual computing systems includes resource components from two or more of the computing systems, wherein the generated index includes a ranking of the plurality of candidate virtual computing systems based on factors that include a number of hops among the resource components in each candidate virtual computing system and a bandwidth amount provided by the resource components in each candidate virtual computing system;
    utilizing the index to select a virtual computing system from among the candidate virtual computing systems;
    applying identification data corresponding to resource components of the selected virtual computing system as input to a certified computing system configuration to identify a level of compliance of the selected virtual computing system; and
    in the event one or more of the resource components of the selected virtual computing system is determined to be non-compliant in accordance to the certified computing system configuration, identifying and updating the one or more non-complaint resource components; and
    creating the selected virtual computing system using the resource components.

2. The method of claim 1 comprising retrieving remediation content for the components of the selected virtual computing system and utilizing the remediation content to conduct an update procedure on the resource components of the selected virtual computing system in accordance with the certified computing system configuration.

3. The method of claim 1 wherein identifying resource components collectively contained in the plurality of computing systems includes identifying technological extensions collectively contained in the plurality of computing systems.

4. The method of claim 1 wherein the resource components include compute components, network components, and storage components.

5. The method of claim 1 wherein the plurality of computing systems are interconnected without utilizing a patch panel device.

6. A system to create and update a virtual computing system comprising distributed resource components comprising:
   a plurality of computing systems interconnected to form a computing system network;
   a virtual computing system management (VCSM) engine configured to:
      identify resource components collectively contained in the plurality of computing systems;
      generate an index that specifies a plurality of candidate virtual computing systems, wherein each of the candidate virtual computing systems includes resource components from two or more of the computing systems, wherein the generated index includes a ranking of the plurality of candidate virtual computing systems based on factors that include a number of hops among the resource components in each candidate virtual computing system and a bandwidth amount provided by the resource components in each candidate virtual computing system;
      utilize the index to select a virtual computing system from among the candidate virtual computing systems;
      apply identification data corresponding to resource components of the selected virtual computing system as input to a certified computing configuration to identify a level of compliance of the selected virtual computing system; and
   in the event one or more of the resource components of the selected virtual computing system is determined to be non-compliant in accordance to the certified computing system configuration, identifying and updating the one or more non-complaint resource components; and
   creating the selected virtual computing system using the resource components.

7. The system of claim 6 wherein the VCSM engine is further configured to obtain remediation content for the components of the selected virtual computing system and utilize the remediation content to conduct an update procedure on the resource components of the selected virtual computing system in accordance with the certified computing system configuration.

8. The system of claim 6 wherein the VCSM engine is further configured to identify technological extensions collectively contained in the plurality of computing systems.

9. The system of claim 6 wherein the resource components include compute components, network components, and storage components.

10. The system of claim 6 wherein the VCSM engine is further configured to interconnect the plurality of computing systems without utilizing a patch panel device.

11. A non-transitory computer readable medium having stored thereon executable instructions that when executed by the processor of a computer cause the computer to perform steps comprising:
   identifying resource components collectively contained in a plurality of computing systems interconnected to form a computing system network;
   generating an index that specifies a plurality of candidate virtual computing systems, wherein each of the candidate virtual computing systems includes resource components from two or more of the computing systems, wherein the generated index includes a ranking of the plurality of candidate virtual computing systems based on factors that include a number of hops among the resource components in each candidate virtual computing system and a bandwidth amount provided by the resource components in each candidate virtual computing system;
   utilizing the index to select a virtual computing system from among the candidate virtual computing systems;
   applying identification data corresponding to resource components of the selected virtual computing system as input to a certified computing system configuration to identify a level of compliance of the selected virtual computing system; and
   in the event one or more of the resource components of the selected virtual computing system is determined to be non-compliant in accordance to the certified computing system configuration, identifying and updating the one or more non-complaint resource components; and
   creating the selected virtual computing system using the resource components.

12. The non-transitory computer readable medium of claim 11 comprising retrieving remediation content for the components of the selected virtual computing system and utilizing the remediation content to conduct an update procedure on the resource components of the selected virtual computing system in accordance with the certified computing system configuration.

13. The non-transitory computer readable medium of claim 11 wherein identifying resource components collectively contained in the plurality of computing systems includes identifying technological extensions collectively contained in the plurality of computing systems.

14. The non-transitory computer readable medium of claim 11 wherein the resource components include compute components, network components, and storage components.

* * * * *